United States Patent
Eckert et al.

(10) Patent No.: US 10,164,938 B2
(45) Date of Patent: Dec. 25, 2018

(54) TOPOLOGY-AWARE ADDRESSING FOR RECONFIGURABLE NETWORKS

(71) Applicant: Cisco Technology, Inc., San Jose, CA (US)

(72) Inventors: Toerless Eckert, Mountain View, CA (US); B. L. Balaji, Bangalore (IN); Michael Freed, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 15/254,591

(22) Filed: Sep. 1, 2016

(65) Prior Publication Data

US 2018/0063075 A1 Mar. 1, 2018

(51) Int. Cl.
H04L 29/12 (2006.01)
H04L 12/24 (2006.01)

(52) U.S. Cl.
CPC .......... *H04L 61/2015* (2013.01); *H04L 41/12* (2013.01); *H04L 61/2038* (2013.01); *H04L 61/609* (2013.01)

(58) Field of Classification Search
None
See application file for complete search history.

(56) References Cited

U.S. PATENT DOCUMENTS

| | | | |
|---|---|---|---|
| 7,929,535 B2 * | 4/2011 | Chen | H04L 61/2007 370/349 |
| 8,037,204 B2 | 10/2011 | Breton et al. | |
| 8,842,531 B2 | 9/2014 | Shigeeda et al. | |

(Continued)

FOREIGN PATENT DOCUMENTS

WO WO-2014154826 A1 10/2014

OTHER PUBLICATIONS

Lemon, T., "Customizing DHCP Configuration on the Basis of Network Topology", Internet-Draft, <draft-lemon-dhc-topo-conf-01>, Apr. 13, 2013, 9 pages, Internet Engineering Task Force Trust.

(Continued)

*Primary Examiner* — Thomas J Dailey
(74) *Attorney, Agent, or Firm* — Parker Ibrahim & Berg LLP; James M. Behmke; Stephen D. LeBarron

(57) ABSTRACT

In one embodiment, an addressing agent determines a logical static IP addressing scheme for a computer network, the addressing scheme shared with an application server and defining a static mapping of IP addresses to particular types of application-based devices that are managed by the application server in particular physical locations within the computer network. The addressing agent determines a topology of the computer network indicative of application-based devices, their type, and their physical location. The addressing agent calculates a dynamic IP address for the devices based on their type and physical location as defined by the addressing scheme, and collaboratively assigns their corresponding calculated dynamic IP address. The application server can thus manage application-based devices according to whichever device of a particular type is in a particular physical location based on the addressing scheme, regardless of which particular application-based device of that particular type is in that particular physical location.

18 Claims, 15 Drawing Sheets

(56) References Cited

U.S. PATENT DOCUMENTS

| | | | | |
|---|---|---|---|---|
| 2003/0108176 A1* | 6/2003 | Kung | ............... | H04M 3/54 |
| | | | | 379/211.02 |
| 2005/0262218 A1* | 11/2005 | Cox | ............... | H04L 61/2015 |
| | | | | 709/217 |
| 2011/0032870 A1* | 2/2011 | Kumar | ............... | H04W 12/12 |
| | | | | 370/328 |
| 2014/0032734 A1 | 1/2014 | Shigeeda et al. | | |
| 2015/0134802 A1 | 5/2015 | Van Den Wouwer | | |

OTHER PUBLICATIONS

Bernardos, et al., "Survey of IP address autoconfiguration mechanisms for MANETs", Internet-Draft, <draft-bernardos-manet-autoconf-survey-04>, Nov. 2, 2008, 50 pages, Internet Engineering Task Force Trust.

* cited by examiner

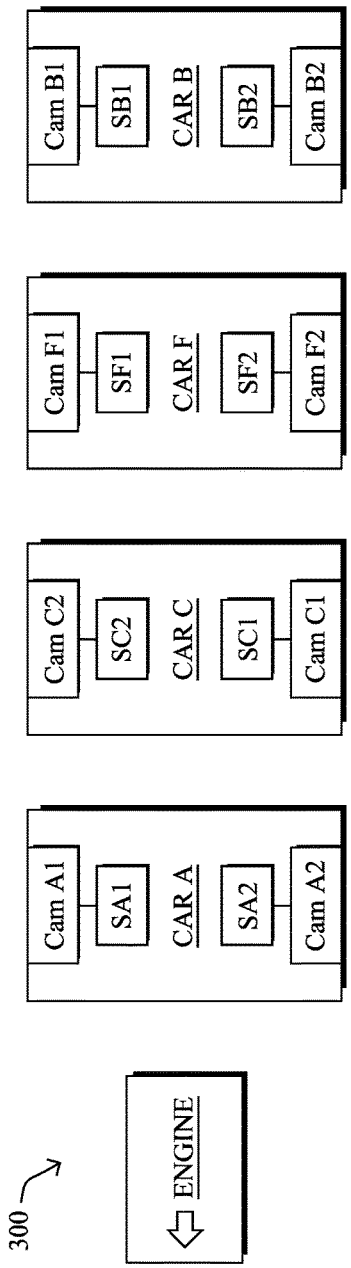
FIG. 3A
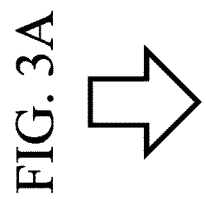
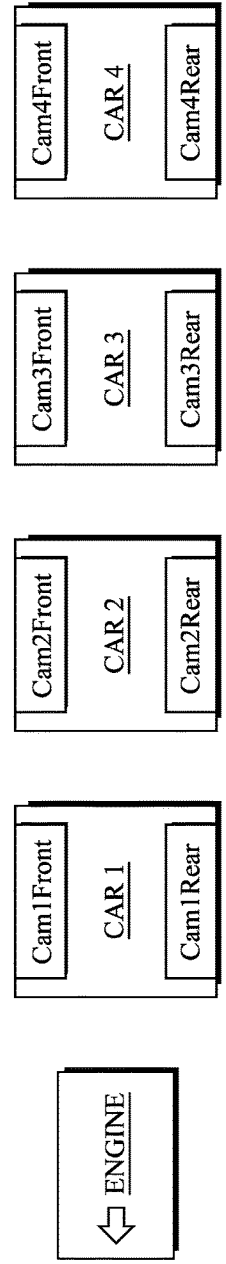
FIG. 3B

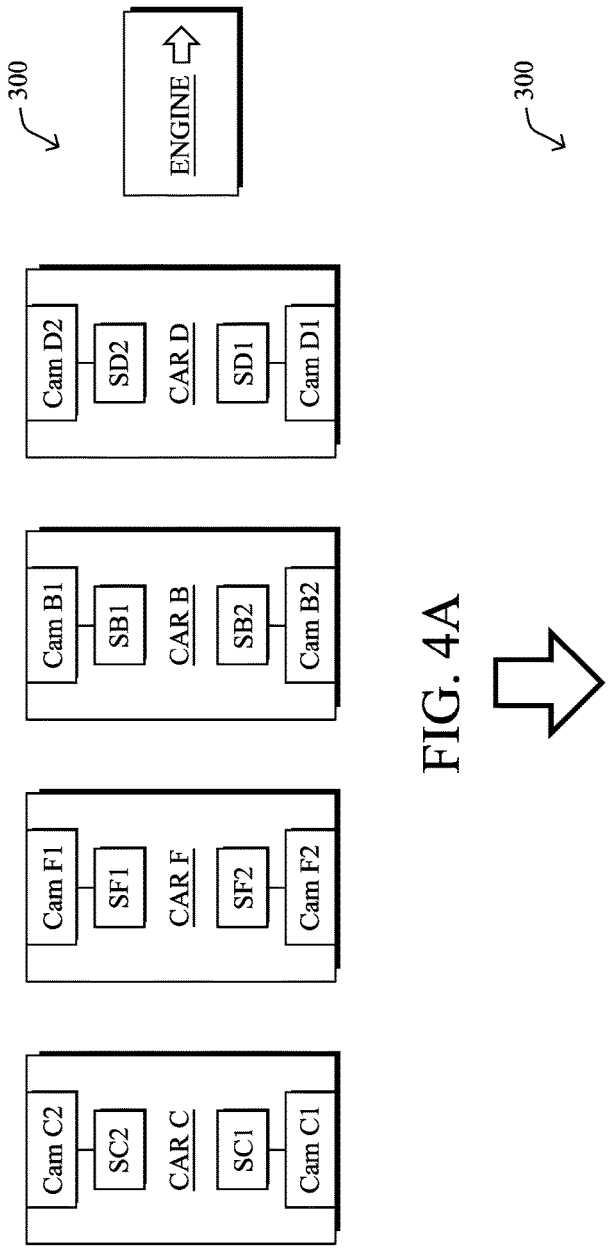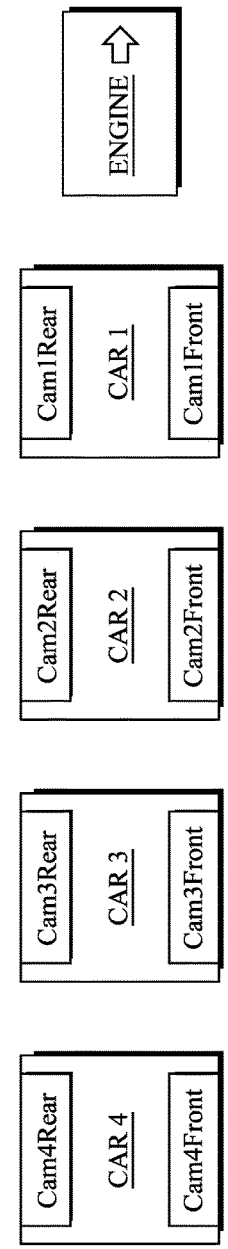

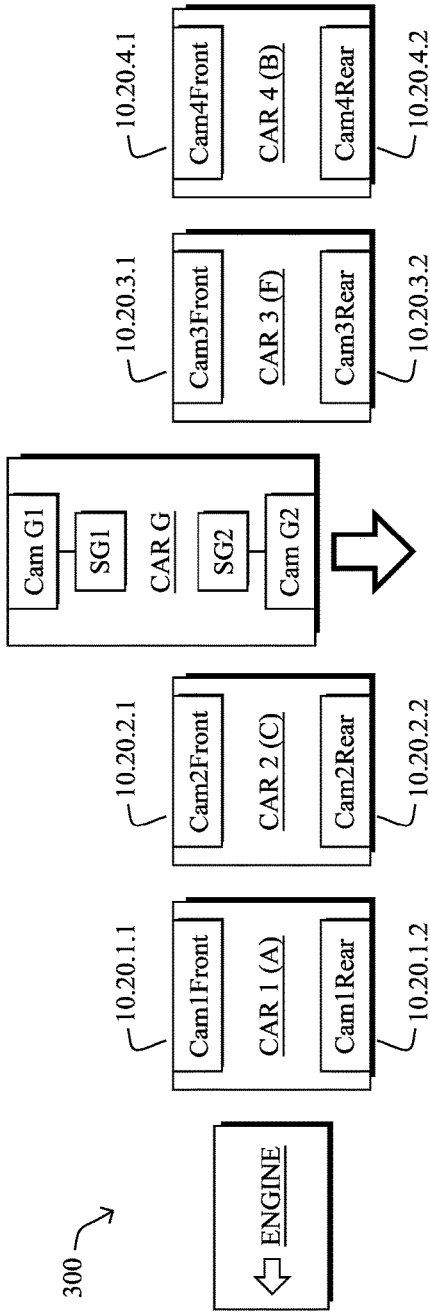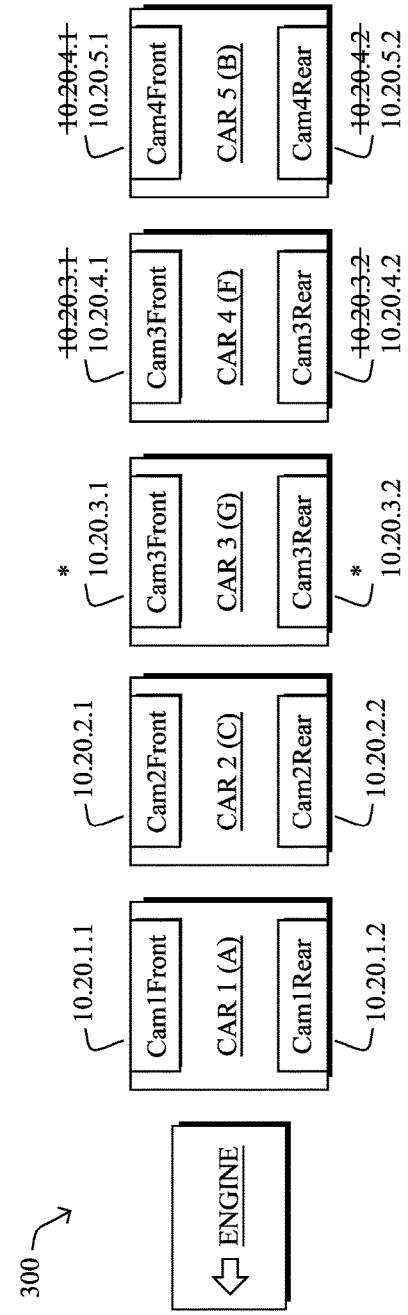

TOPOLOGY-AWARE ADDRESSING FOR RECONFIGURABLE NETWORKS

TECHNICAL FIELD

The present disclosure relates generally to computer networks, and, more particularly, to topology-aware addressing for reconfigurable networks.

BACKGROUND

In networks where the topology changes, business applications often have dependency against this topology and need to be manually reconfigured whenever the topology changes. For example, train-based networks are an example type of network where applications may be based on the location of certain devices within the trains (e.g., "the camera at the front of the second car"). However, as train cars are moved, reorganized, reoriented, etc., it becomes difficult for the business applications to manage the devices, particularly to keep track of their locations and to be able to access them properly.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrate an example topology view and application-based view of a location-based network;

FIGS. 4A-4B illustrate an example of a different topology of FIG. 3A and an updated application-based view of the location-based network;

FIGS. 8A-8B illustrate example changes to the example location-based networks and topology-aware addressing of FIGS. 3A, 4A, and 5A;

DESCRIPTION OF EXAMPLE EMBODIMENTS

Overview

Figure 1:
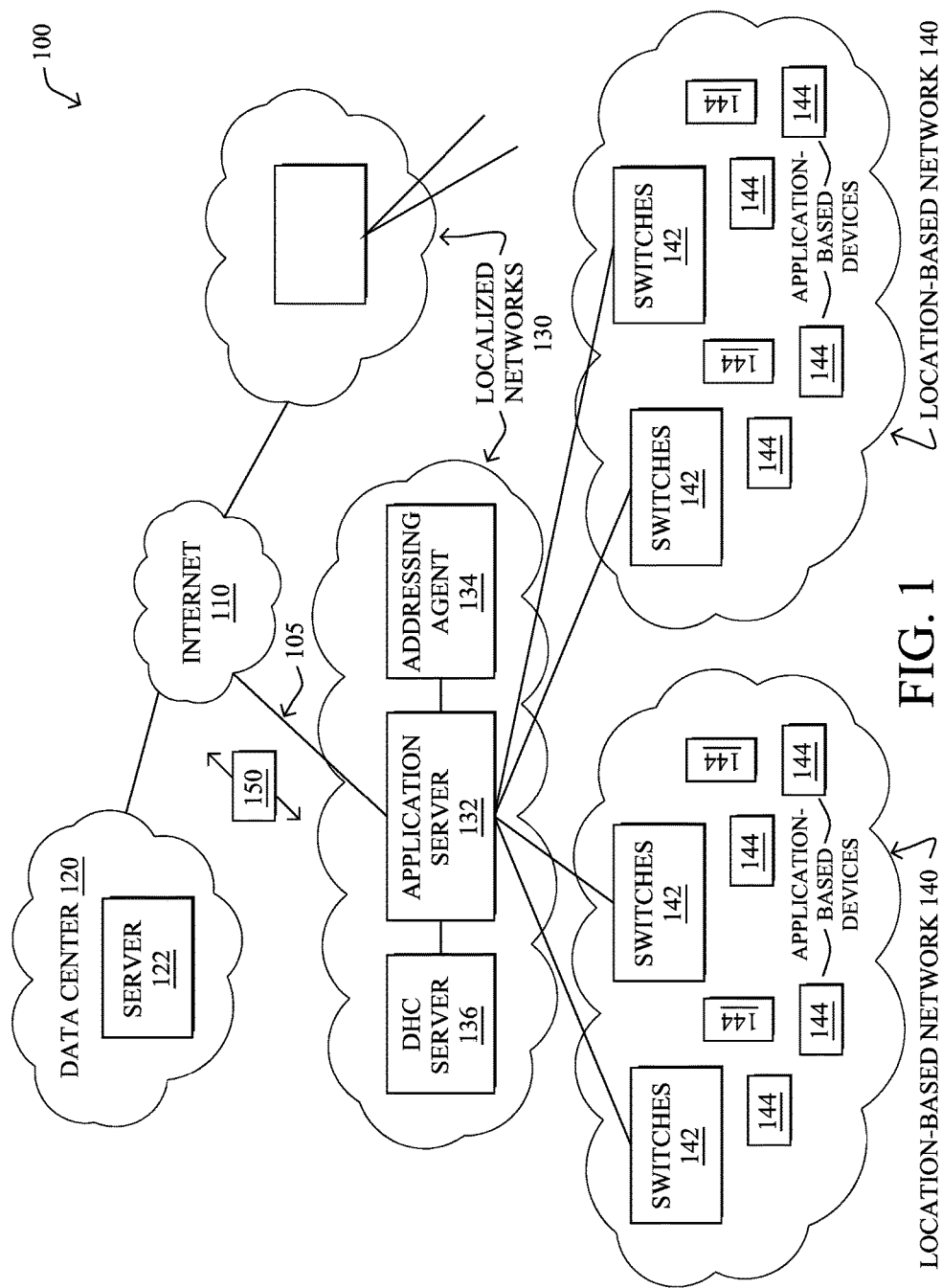
FIG. 1 illustrates an example computer network.

According to one or more embodiments of the disclosure, an addressing agent determines a logical static Internet Protocol (IP) addressing scheme for a particular computer network, the logical static IP addressing scheme shared with an application server and defining a static mapping of IP addresses to one or more particular types of application-based devices that are managed by the application server in particular physical locations within the particular computer network. The addressing agent may then determine a topology of the particular computer network, the topology indicative of one or more application-based devices connected in the particular computer network, a type of each of the one or more application-based devices, and a physical location of each of the one or more application-based devices within the particular computer network. Accordingly, the addressing agent may then calculate a dynamic IP address for each of the one or more application-based devices based on the type and physical location of the respective application-based device as defined by the logical static IP addressing scheme, and collaboratively assigns the corresponding calculated dynamic IP address to each respective application-based device of the one or more application-based devices in the particular computer network, allowing the application server to manage the one or more application-based devices according to whichever device of a particular type is in a particular physical location based on the logical static IP addressing scheme regardless of which particular application-based device of that particular type is in that particular physical location.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

FIG. 1 is a schematic block diagram of an example simplified computer network 100 illustratively comprising nodes/devices at various locations/levels of a network, interconnected by various methods of communication. For instance, the links 105 may be wired links (e.g., Ethernet links, power-over-Ethernet or "PoE" links, etc.) or shared media (e.g., wireless links, power-line communication or "PLC" links, etc.) where certain network devices, such as, e.g., routers, sensors, computers, etc., may be in communication with other devices, e.g., based on connectivity, distance, signal strength, current operational status, location, etc. Specifically, as shown in the example network 100, a WAN (e.g., the Internet) 110 may interconnect various other networks, such as a data center network 120 with one or more servers 122 (e.g., storage, compute, etc.) and one or more localized networks 130 (e.g., LANs, virtual LANs or "VLANs", virtual private networks or "VPNs", etc.). Localized networks may have their own servers (e.g., application servers 132, dynamic host configuration protocol or "DHCP" servers 136, etc.) or other agents 134 or other devices as appropriate. Connected to (or as a part of) each localized network 130 may be one or more location-based networks 140, which, as described below, may contain one or more switches (or routers) 142 and one or more location-based (e.g., and application-based) devices 144 that have some form of physical (locational) relationship between one another.

Data packets 150 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain simplified orientation, the network 100 is merely an example illustration that is not meant to limit the disclosure. In particular, any number of devices may be between each pair of devices, and the devices may span any level of the network, such as in a cloud layer, fog layer, IoT layer, core, edge, provider, customer, and so on, as will be appreciated by those skilled in the art. Further, while certain servers, agents, or devices are shown within particular portions of the networks, such servers, agents, or devices may be located in any suitable network location, and need not be collocated with other servers, agents, or devices in a manner as shown in FIG. 1. Also, with reference to the techniques described below, a location-based network 140 need not be individually contained to a particular space (such as connected train cars), but may span multiple physical locations (similar to a VLAN), such as an enterprise network having branch offices in different cities being considered a "location-based network", where the location relationships may be floors of a building, buildings in a campus, and campuses in different cities, and so on.

Figure 2:
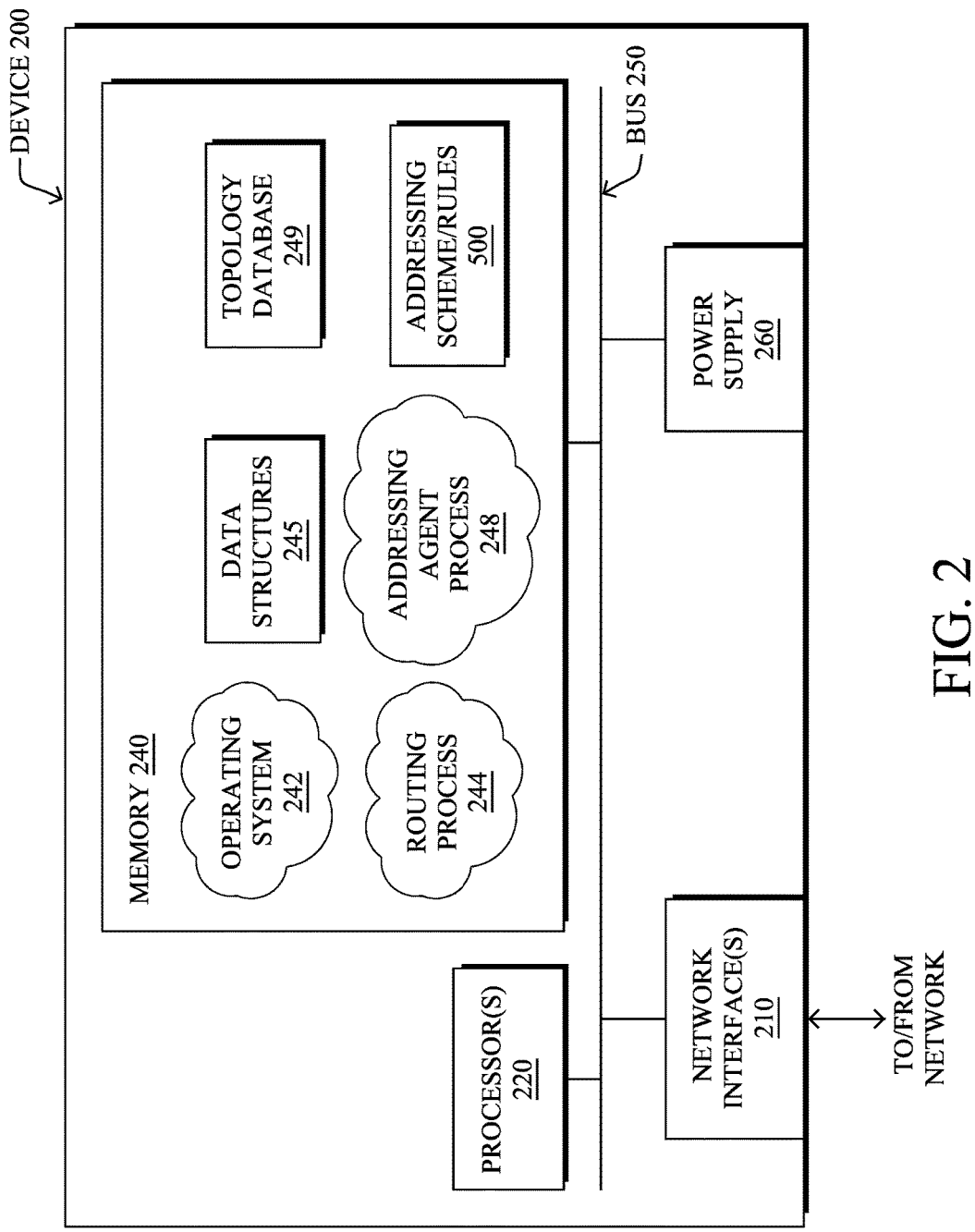
FIG. 2 illustrates an example network device.

FIG. 2 is a schematic block diagram of an example node/device 200 that may be used with one or more embodiments described herein, e.g., particularly as an addressing agent (e.g., agent 134), or else any other suitable device in FIG. 1 above (e.g., servers 132/122). That is, though the techniques herein generally refer to operation of an addressing agent 134, various components of collaboration may occur between an addressing agent and one or more servers or application-based devices, and as such, the particular arrangement of processes and data structures shown in FIG. 2 is merely one representative example not meant to be limiting to the scope of the present disclosure.

The device 200 may comprise one or more network interfaces 210, at least one processor 220, and a memory 240 interconnected by a system bus 250, as well as a power supply 260 (e.g., battery, plug-in, etc.). The network interface(s) 210 contain the mechanical, electrical, and signaling circuitry for communicating data over links coupled to the network 100. The network interfaces may be configured to transmit and/or receive data using a variety of different communication protocols. Note, further, that the devices may have two different types of network connections 210, e.g., wireless and wired connections, and that the view herein is merely for illustration. Also, while the network interface 210 is shown separately from power supply 260, for devices using power-line communication (PLC) or Power over Ethernet (PoE), the network interface 210 may communicate through the power supply 260, or may be an integral component of the power supply. In some specific configurations the PLC/PoE signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as an illustrative topology database 249 and an addressing scheme/rules database 500, as described below. An operating system 242, portions of which are typically resident in memory 240 and executed by the processor, functionally organizes the device by, among other things, invoking operations in support of software processes and/or services executing on the device. These software processes and/or services may comprise routing process/services 244, and an illustrative addressing agent process 248, as described herein. Note that while the processes 244 and 248 are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a-priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, routing process 244 may be used to determine a network topology (stored in database 249) either as a participating device within a given network (e.g., location-based networks 140), or else by communicating with a topology generating device within such networks. Note further that routing process 244 may also perform functions related to virtual routing protocols, such as maintaining VRF instances.

As noted above, in networks where the topology changes, business applications often have dependency against this topology and need to be manually reconfigured whenever the topology changes. For example, train-based networks are an example type of location-based network where applications may be based on the location of certain devices within the trains (e.g., "the camera at the front of the second car"). However, as train cars are moved, reorganized, reoriented, etc., it becomes difficult for the business applications to manage the devices, particularly to keep track of their locations and to be able to access them properly.

As an example, consider a train being pulled together from a subset of available cars in random order—this is called train marriage. As shown in the example train-based network 300 FIG. 3A, the inventory names of these cars may be "CarA-CarZ", where each car (CarA, Car B, CarC, and CarF, in the example) has two switches with pre-assigned names, such as "SA1" and "SA2" on CarA, "SZ1" and "SZ2" on CarZ, and so on. When train marriage happens, cars may also be turned 180 degrees depending on their availability in the depot. Assume further for this example, that inside each car there are two application-based devices, such as cameras, one on each end the respective car, e.g., CamA1 and CamA2 in CarA, etc.

Once the train is married, a video surveillance application may need to know the cameras with logical names that reflect their locational relationship. For example, as shown in FIG. 3B, because CarA is the first car behind the engine ("Engine"), CamA1 should show up as "Front camera Car 1" (e.g., Cam1Front), and CamA2 as "Rear camera Car 1 (e.g., Cam1Rear). Further, because CarC is the second car from the engine, but turned, Camera 2 in car C (CamC2) should show up as "Front camera Car2" (Cam2Front), and CamC1 should appear as "Rear camera Car2" (Cam2Rear), and so on, as shown.

Assume now that in this example, with reference to FIG. 4A, the train gets re-married (e.g., half-way in route), where the original Engine and Car1 (CarA) are removed and become a separate train, and the remaining cars are attached to another engine with a pre-existing CarD and engine (En). As such, the logical numbering of the client devices needs to be changed. That is, and with reference to FIG. 4B, Camera "CamC1" connected to switch SC1 which was "Rear camera Car2" now becomes "Front camera Car4" (Cam4Front), and so on, as shown.

Both during the initial train marriage and the re-marriage, the assignment of logical names to the cameras should require no manual reconfiguration steps. For example, in certain train-network customers, such train marriage happens at least once every day for 600 trains with six cars each, where hundreds of engines may create train-based networks for any arrangement of thousands of different available cars.

Notably, while video surveillance is shown as the example, such logical naming may also be used in train-based networks for other purposes, such as passenger-information-systems for client devices (e.g., displays that show car, train, seat numbers, and the like), as well as for other types of location-based networks (e.g., cameras in buildings, sensors in a field, cars on the road, etc.). Also, while a certain arrangement of devices is shown, any topology configuration may exist in real-world networks, such as any number of switches or routers, different types of communication between cars (e.g., layer-2 vs. layer-3), the topology inside the trains and between cars may differ from operator to operator (e.g., types of application-based devices, number of devices connected to a switch, etc.).

Topology-Aware Addressing for Reconfigurable Networks

The techniques herein provide a solution that avoids the manual configuration noted above, and does so without requiring changes to existing business applications (e.g., no need for new in-business-app development). In particular, the techniques herein are directed to an intelligent system to assign IP addresses to client-devices (e.g., via the dynamic host configuration protocol or "DHCP") based on the client-devices' type and location in a topology-reconfigurable network, such as trains. According to the techniques herein, client device IP addresses are updated as the client device moves, even though the client device can stay connected to a network switch (in, for example, a train car) while the switch moves around within the network (e.g., the train car moves around). (Note that the one specific example of business cases are in-train networks in the transportation industry, the techniques herein are applicable to any reconfigurable topology solution.)

Specifically, according to one or more embodiments of the disclosure as described in detail below, an addressing agent determines a logical static IP addressing scheme for a computer network, the addressing scheme shared with an application server and defining a static mapping of IP addresses to particular types of application-based devices that are managed by the application server in particular physical locations within the computer network. The addressing agent determines a topology of the computer network indicative of application-based devices, their type, and their physical location. The addressing agent calculates a dynamic IP address for the devices based on their type and physical location as defined by the addressing scheme, and collaboratively assigns their corresponding calculated dynamic IP address. The application server thus is allowed to manage application-based devices according to whichever device of a particular type is in a particular physical location based on the addressing scheme, regardless of which particular application-based device of that particular type is in that particular physical location.

Illustratively, the techniques described herein may be performed by hardware, software, and/or firmware, such as in accordance with the addressing agent process 248, which may contain computer executable instructions executed by the processor 220 to perform functions relating to the techniques described herein, e.g., in conjunction with dynamic addressing processes (e.g., DHCP processes) on other devices in the computer network, as well as with various applications of an application server in order to align the defined addressing schemes, as generally described herein.

Operationally, a policy ruleset, or more particularly, a logical static Internet Protocol (IP) addressing scheme 500, is a high-level scripting/programming used to define the location-based IP addresses to be dynamically assigned to new client devices based on their network topology, and to change their addressing when the topology changes. Specifically, an addressing agent 134 corresponding to a given computer network (e.g., localized network 130 or per location-based network 140) can determine this addressing scheme (policy ruleset) for the particular computer network, either through configuration directly of the agent 134, or else through communication with an application server 132.

In accordance with the techniques herein, that is, the addressing scheme is shared with one or more application servers 132, and is used to define a static mapping of IP addresses to various types of application-based devices (clients) 144 that are managed by the application server(s), based on particular physical locations of the devices within the network. Accordingly, the addressing scheme may be programmed on the agent 134 directly by an administrator, or else may receive the most up-to-date addressing scheme from the server(s) 132.

The agent 134 is thus configurable (e.g., by scripting programming language) to be customizable to perform the address calculation for different types of reconfigurable topologies and to be able to recognize different type of client devices. Notably, the agent may be provisioned once with the appropriate programming (addressing scheme 500) for the reconfigurable topology in question, and only requires updating when the corresponding application using the addressing scheme is re-programmed with a new addressing scheme.

Figure 5A:
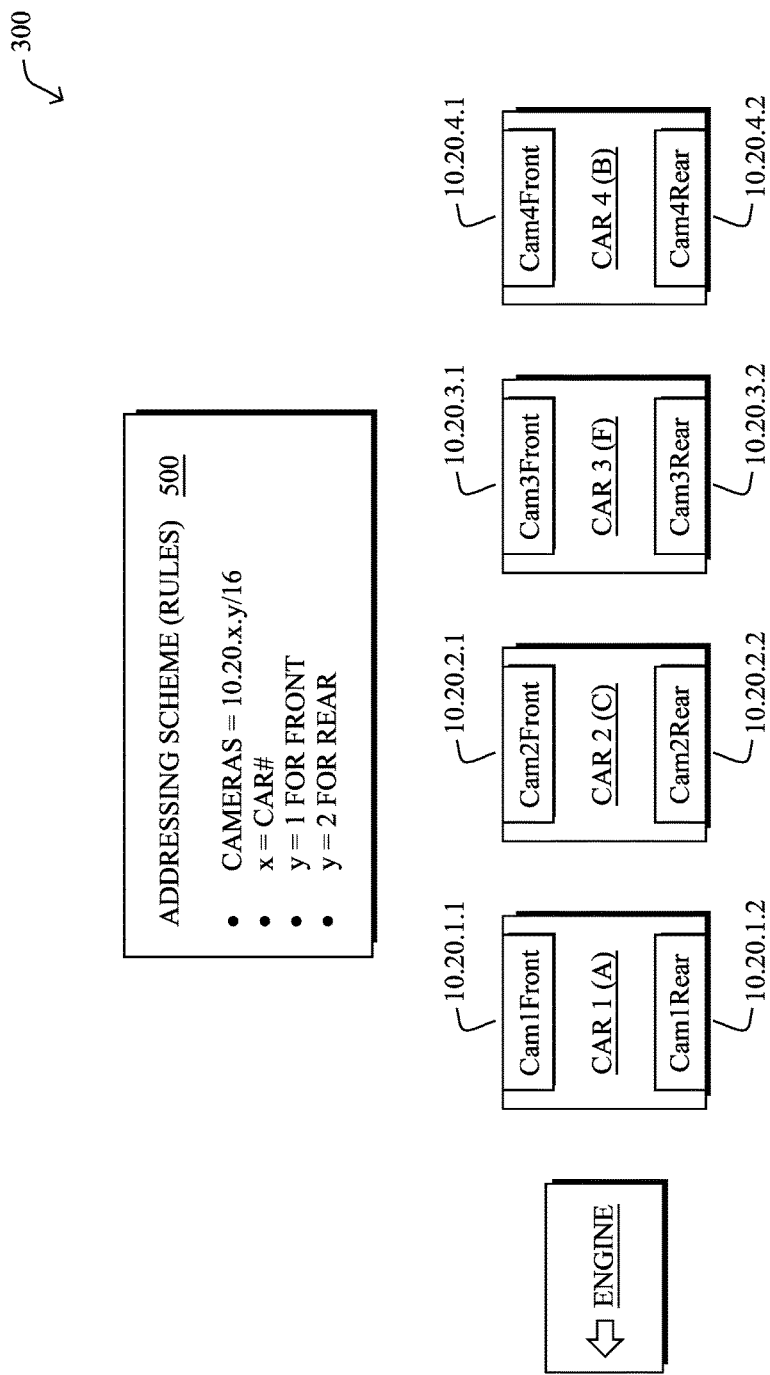
FIGS. 5A-5B illustrate an example of a topology-aware addressing scheme for reconfigurable networks that may be applied to the example location-based networks of FIGS. 3A-4B.

An example of an addressing scheme 500 is shown in FIG. 5A, where the example computer network in question is an illustrative train-based network according to FIGS. 3A-4B above. Illustratively, an example logical static IP addressing scheme may be designed where cameras on a train are given IP (e.g., IPv4) addresses of "10.20.x.y/16" (where "/16" denotes a prefix "10.20." for all cameras in the network, and the "x" and "y" are used to individually define particular cameras within that address prefix). As an example, assume that "x" is defined as a number of a car in a train (e.g., from an engine, to car 1, then car 2, then car 3, etc.), and "y" is defined to represent a particular location of a camera, such as y=1 for a "front" camera (closer to the engine), and "y=2" for a "rear" camera (further from the engine).

Based on this addressing scheme 500, an application server 132 (e.g., video surveillance server) may be configured (once) with a static mapping of these logical IP addresses to desired logical names within the application programming, such as, for example: "10.20.1.1"="Front Camera Car 1", "10.20.5.2"="Rear Camera Car 5", and so on. Both the application servers and the addressing agent 134 for the network may thus be configured with the same addressing scheme, so that as described herein, the application-based devices 144 can be assigned IP address corresponding to their locations within the network (and updated in response to changes, accordingly).

With particular reference to FIG. 5A, for example, in a train as shown above in FIGS. 3A-3B, namely, "Engine-A-C-F-B" (from left to right), the addresses of the cameras in that train should be, according to the addressing scheme 500:

10.20.1.1=Front Camera Car 1=CamA1, CarA;
    10.20.1.2=Rear Camera Car 1=CamA2, CarA;
    10.20.2.1=Front Camera Car 2=CamC2, CarC;
    10.20.2.2=Rear Camera Car 2=CamA1, CarC;
    10.20.3.1=Front Camera Car 3=CamF1, CarF;
    10.20.3.2=Rear Camera Car 3=CamF2, CarF;
    10.20.4.1=Front Camera Car 4=CamB1, CarB; and
    10.20.4.2=Rear Camera Car 4=CamB2, CarB.

Figure 5B:
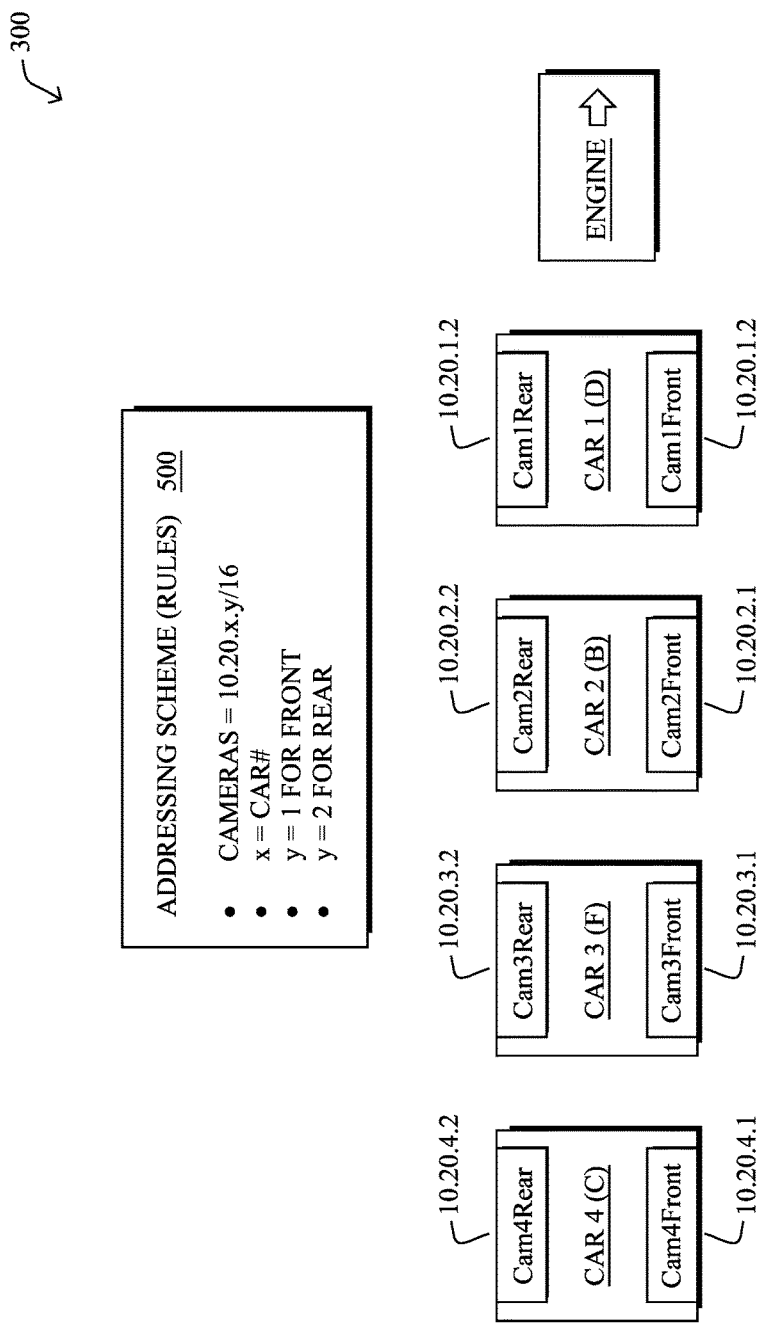

Conversely, when the topology of the train-based network has changed to the configuration in FIGS. 4A-4B, then as shown in FIG. 5B, the addresses of the cameras in this newly-created train "Engine-D-B-F-C" (from right to left) should be, according still to the addressing scheme 500:

10.20.1.1=Front Camera Car 1=CamD1, CarD;
    10.20.1.2=Rear Camera Car 1=CamD2, CarD;
    10.20.2.1=Front Camera Car 2=CamB2, CarB;
    10.20.2.2=Rear Camera Car 2=CamB1, CarB;
    10.20.3.1=Front Camera Car 3=CamF2, CarF;
    10.20.3.2=Rear Camera Car 3=CamF1, CarF;
    10.20.4.1=Front Camera Car 4=CamC1, CarC; and
    10.20.4.2=Rear Camera Car 4=CamC2, CarC.

As can be readily seen from a comparison between the first and second trains of FIGS. 5A and 5B, respectively, regardless of the actual cars in the train (A, B, C, etc.), their connection, their orientation, their order, their direction, etc., as far as the application server 132 is concerned, the IP address of the "first car's front camera" is always the same (i.e., 10.20.1.1), the IP address of the "third car's rear camera" is always the same (i.e., 10.20.3.2), and so on. In this manner, the techniques herein allow the application to be programmed based on the locations of the associated devices/client 144, such that the application server 132 can manage application-based devices 144 according to whichever device (of a particular type, e.g., camera) is in a particular physical location (e.g., "Rear Camera Car 4") based on the logical static IP addressing scheme (e.g., 10.20.4.2), regardless of which particular application-based device of that particular type is in that particular physical location.

According to one or more embodiments of the techniques herein, therefore, the addressing agent 134 must determine a topology of the particular computer network (e.g., of the trains), where the topology identifies the set of application-based devices connected in the particular computer network, as well as a type of the application-based devices, and their physical location within the particular computer network. For instance, though a typical routing topology is only concerned with communication connectivity (e.g., device X can talk to device Y, device Y can talk to device X and device Z, etc.), the techniques herein may define a topology according to a physical location of devices in the computer network, such as a device location in relation to other devices in the computer network. Said differently, the agent 134 has full (and continuous) network topology knowledge, including information about the inter-network device topology and the network-device-to-client connections and client properties, and can determine sufficient location-based information in order to apply the policy rules of addressing scheme 500 to the devices of the network.

In one embodiment, the addressing agent 134 may determine the topology itself (e.g., participating in a routing protocol exchange within the location-based network 140), or else may receive the topology from a topology collection system. For instance, this topology (and client-information) collection system may comprise a specific device or application in the location-based network, such as a switch 142 (e.g., one on an engine car of the particular train, which communicates with other switches 142 of the other train cars, etc.). This topology collection system, in whatever configuration it embodies, may be configured to dynamically collect/update the following for the agent 134:

I) A topology of network: router/switches 142, application-based devices 144, their connections, and key parameters (e.g., addresses, device-names, role/type, etc.);

II) Available addressing range(s) (IPv4/IPv6) on client interfaces; and

III) Protocol parameters learned from client (e.g., discovery protocol parameters, 802.1x parameters (e.g., certificates, etc.), DHCP request parameters (e.g., option 60), as well as "Device Sensor" classification results for clients).

For example, in the illustrative train-based network herein, the topology collection system may first find an Engine in the topology by specific topology characteristics or properties of the associated switch (e.g., a name or property configuration of the switch), and may then enumerate cars in the topology by knowing upfront the topology scheme (e.g., two switches per car) or by using "car-config" from car-switches (e.g., stored on a flash in the car switches).

From this topology information, the addressing agent 134 may calculate a dynamic IP address to assign to each of the application-based devices 144 in the network (e.g., cameras in the train) based on the type and physical location of the respective application-based device as defined by the logical static IP addressing scheme 500. For instance, as shown above in FIGS. 5A-5B, the agent 134 may designate a "role" of a client device by recognizing a client-device-type property in the topology (e.g., a discovery protocol parameter/identifier, DHCP option 60, device classifiers, etc.), and the client device's location in the topology (e.g., a camera CamA1 connected to a switch SA1 that is in the "front" of a car CarA in the current topology implies that this camera CamA1 is the "front" camera right now in this particular car). By mapping the calculated role of each client/application-based device 144 to the addressing scheme 500, the addressing agent may thus designate the appropriate IP address for the device to be managed by the application server 132, accordingly (e.g., CamA1=front camera of the first car of the train==10.20.1.1, as in FIG. 5A).

Once the corresponding dynamic IP addresses are calculated, the addressing agent 134 then "collaboratively assigns" those addresses to each respective application-based device in accordance with one or more embodiments herein. In general, such collaboration may involve a dynamic host configuration protocol (DHCP) server 136 that assigns addresses to the devices (e.g., according to a typical DHCP process, as will be appreciated in the art), but in a manner that allows the DHCP server to give application-based devices/clients 144 the calculated addresses.

Figure 6:
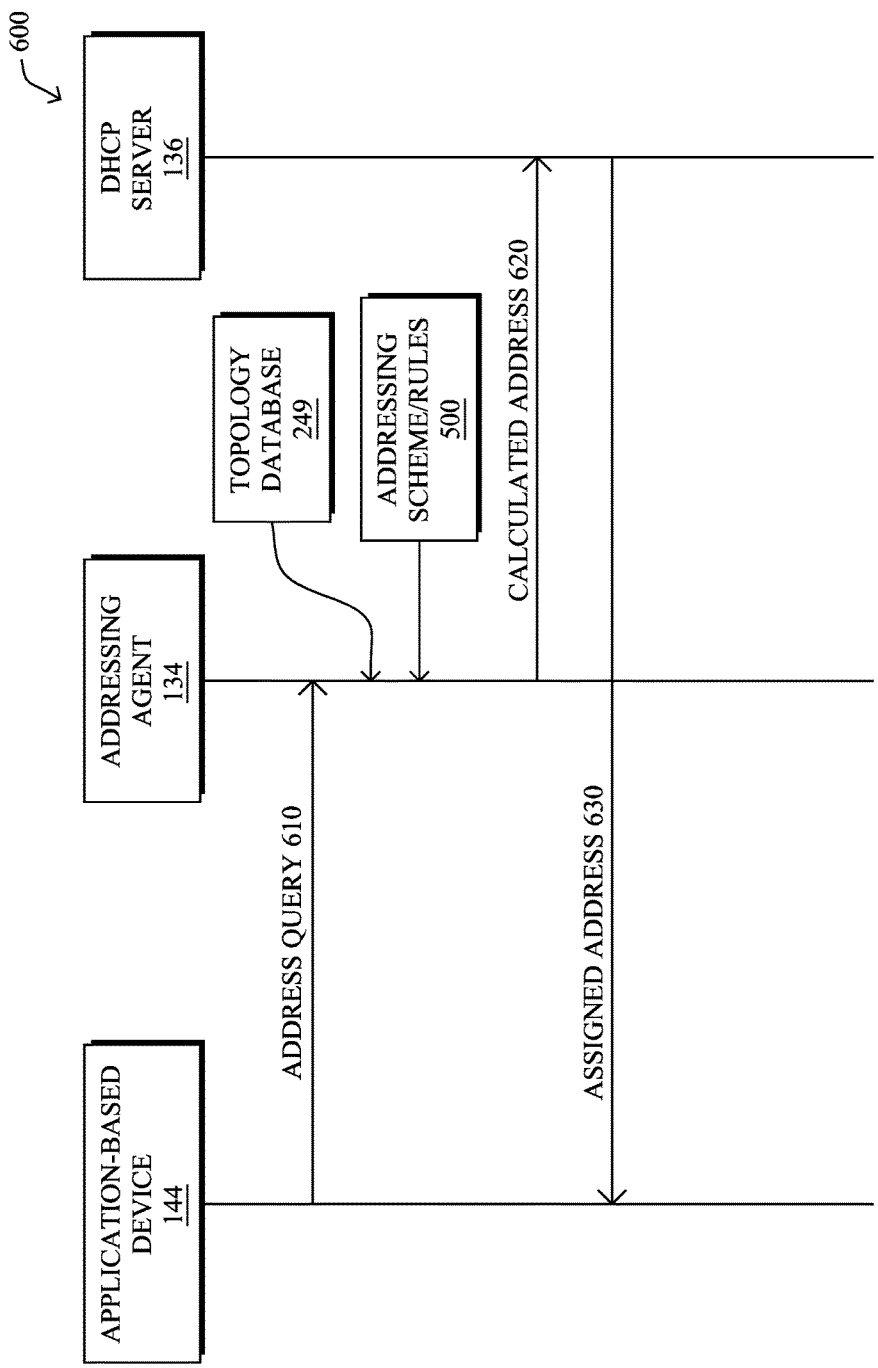
FIG. 6 illustrates an example timeline of topology-aware addressing for reconfigurable networks.

For instance, with reference to the message exchange timeline 600 FIG. 6, an application-based device 144 may be configured to request a dynamically assigned IP address from a DHCP server 136. According to the techniques herein, the application-based device 144 sends an address request/query message 610 toward the DHCP sever 132, and in one embodiment, based on the topology 249 and addressing scheme 500, the addressing agent 134 informs the DHCP server 136 what the calculated address 620 is for this particular device 144. As such, the DHCP server 136 may return the assigned address 630 to the device 144 for configuration of the device, accordingly.

Various collaborative assignment techniques may be used in accordance with the techniques herein. For example, FIGS. 7A-7C illustrate options contemplated specifically herein for the addressing agent 134 to collaboratively assign the IP addresses, though other techniques may also be considered, and the examples shown herein are not meant to be limiting to the scope of the present disclosure.

Figure 7A:
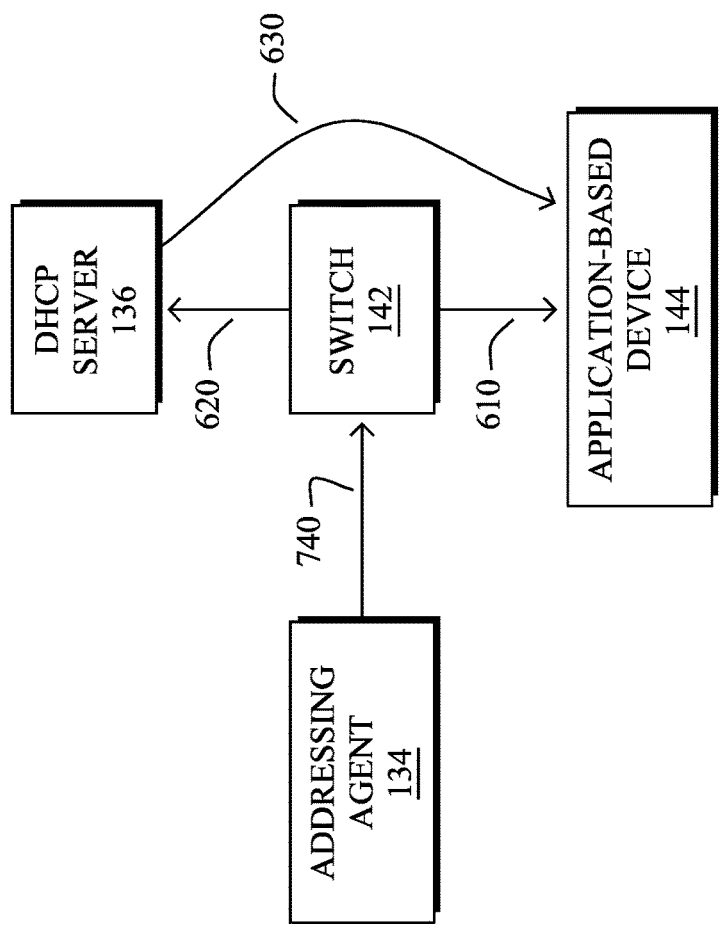
FIGS. 7A-7C illustrate examples of collaboratively assigning topology-aware addresses for reconfigurable networks.
Figure 7B:
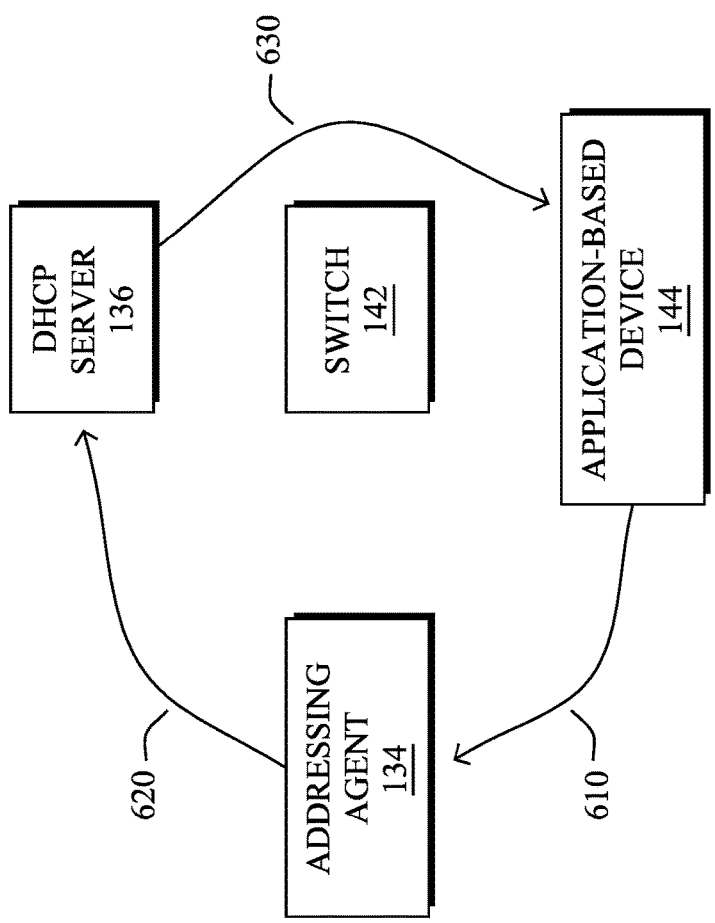
Figure 7C:
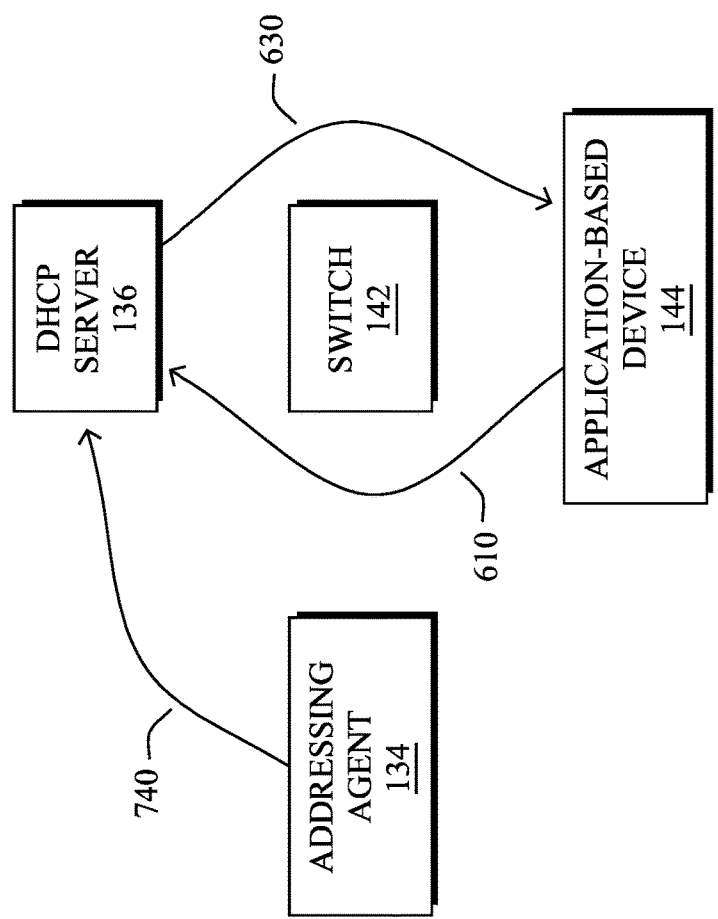

In a first example, as shown in FIG. 7A, the addressing agent 134 may configure DHCP instructions 740 into network devices (e.g., switch 142) of the particular computer network that are providing connectivity to the application-based devices 144. These DHCP instructions may be indicative of the corresponding calculated dynamic IP address 620 for each respective application-based device in the particular computer network. This way, when the address query 610 is received at the switch 142 from a particular application-based device 144, the switch may insert the calculated address 620 into the query 610, and forwards the updated query to the DHCP server 136 for assigning the address according to the instructions.

For example, in one embodiment the DCHP instructions instruct the switches 142 to dynamically set a DHCP "option 82" with the calculated IP address 620 in the corresponding address query 610 for each of the devices in the network. For instance, "option 82" is known in the art as a DHCP relay agent information option, allowing a DHCP relay agent (e.g., the switch 142 in FIG. 7A) to insert information into requests being forwarded to DHCP server 136. By configuring the DHCP server 136 with a fixed rule to recognize this option, the DHCP server may thus extract the calculated IP address 620 from the option (instructions) and correspondingly assign that calculated IP address 630 to the appropriate device.

Relying on option 82 configuration into switches is just one possible instance. For example, as shown in FIG. 7B, the agent 134 itself may intercept DHCP messages (queries 610) from the application-based devices 144 to the DHCP server 136, and inserts the DHCP instructions 740 (calculated addresses 620) into the DHCP messages. Just like in FIG. 7A, the DHCP instructions may be included in an inserted/updated option 82 field, and are indicative of the corresponding calculated dynamic IP address for the respective application-based device 144 sourcing the corresponding intercepted DHCP message 610.

Alternatively still, as shown in FIG. 7C, the addressing agent 134 may directly integrate (e.g., via application programming interfaces or "APIs") into the DHCP server 136. For instance, in this configuration, the addressing agent configures the DHCP instructions 740 into the DHCP server 136. Note that although the DHCP server and addressing agent are shown separately in this embodiment, in a particular alternative implementation of this embodiment, the DCHP server and addressing agent may be components (e.g., processes) of a single server device (that is, the addressing agent is the DHCP server).

One of the key components of the techniques herein is not only the ability to dynamically assign IP addresses during inauguration of the networks, but also the ability to update the IP addresses in response to any changes in the topology of the network, such as reconfiguration due to rearranging current devices, adding new devices, removing current devices, and any combination thereof.

For example, in addition to the topology change shown in FIGS. 3A-5B, FIGS. 8A-8B illustrate another example of a topology change, where a new car CarG is added to the middle of the train of FIGS. 3A-3B and 5A, and the corresponding adjustments that occur to the assigned IP addresses according to the techniques herein. Regardless of the type of change in topology, the techniques herein detect this change, and in response, re-calculate the dynamic IP addresses of application-based (client) devices affected by the change in topology (i.e., based on the type and physical location of the respective application-based device as defined by the logical static IP addressing scheme 500, as described above). For example, with specific reference to FIG. 8B, the new devices from CarG assume the addresses for the "third car" in the train (e.g., 10.20.3.1, and 10.20.3.2), and the following cars (CarF and CarB) must be adjusted to increment their positions to the "fourth car" and "fifth car", respectively (e.g., 10.20.4.y and 10.20.5.y, respectively).

Note that in one embodiment, a client device itself may move (e.g., removed from one location and installed in another), or else in another embodiment, it may stay connected to a same switch while the location of the switch in the network topology may change dynamically (e.g., relative to other switches/devices). The examples shown herein, therefore, are merely illustrative for purposes of discussion, and are not meant to show every possible manner in which a topology change may occur.

Figure 9A:
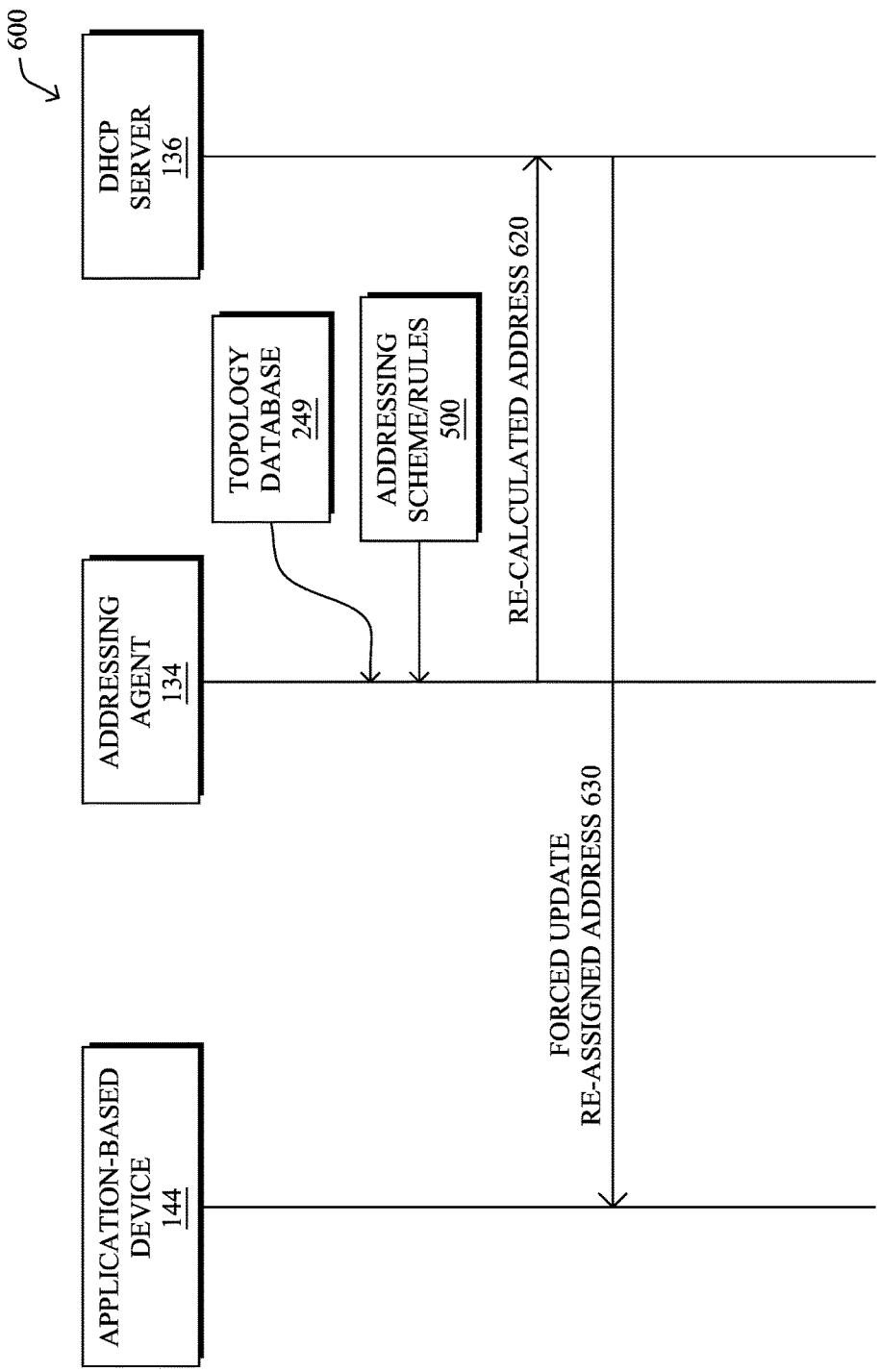
FIGS. 9A-9C illustrate example timelines of topology-aware addressing for reconfigurable networks in response to changes in the topology.
Figure 9B:
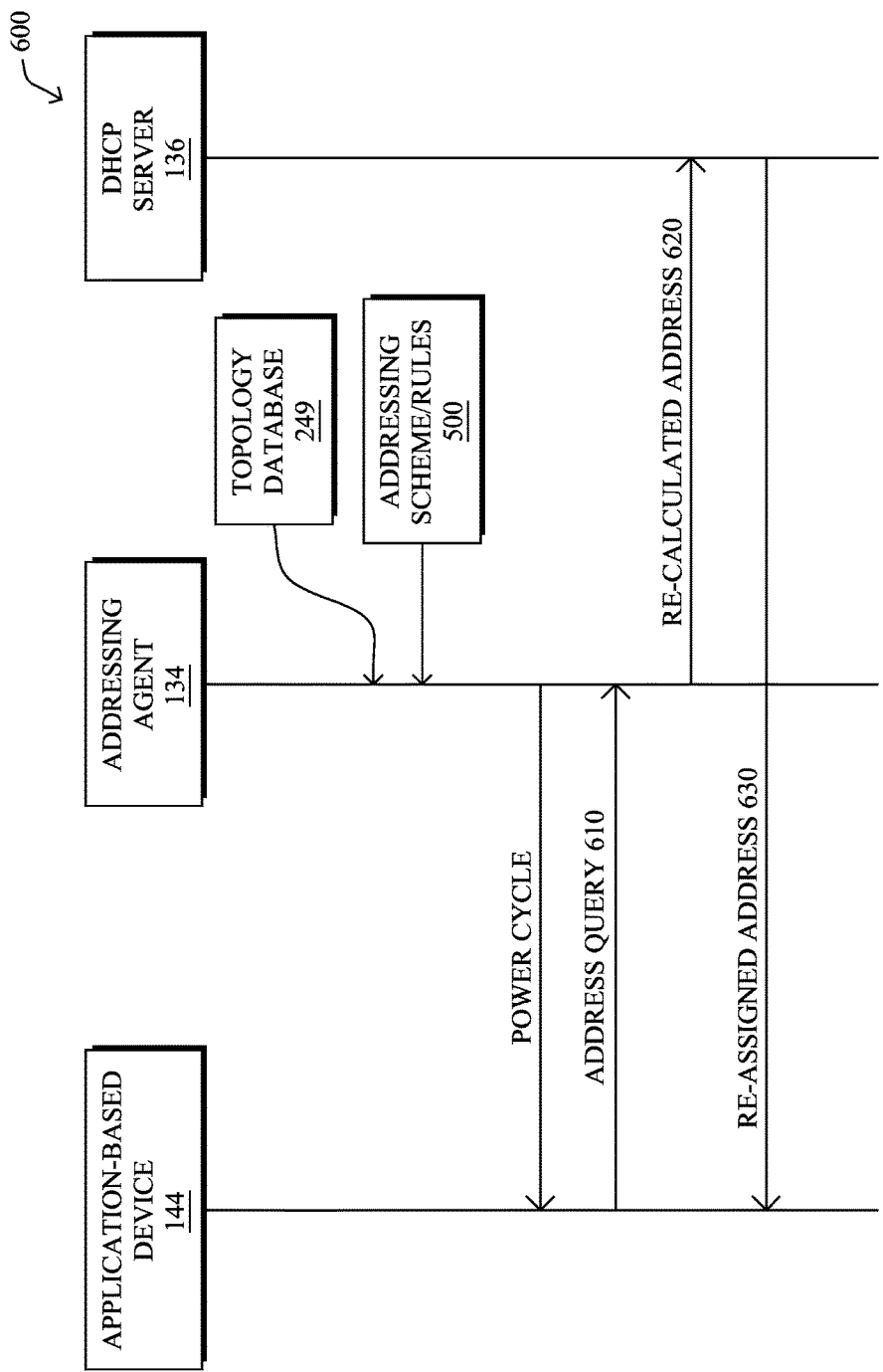
Figure 9C:
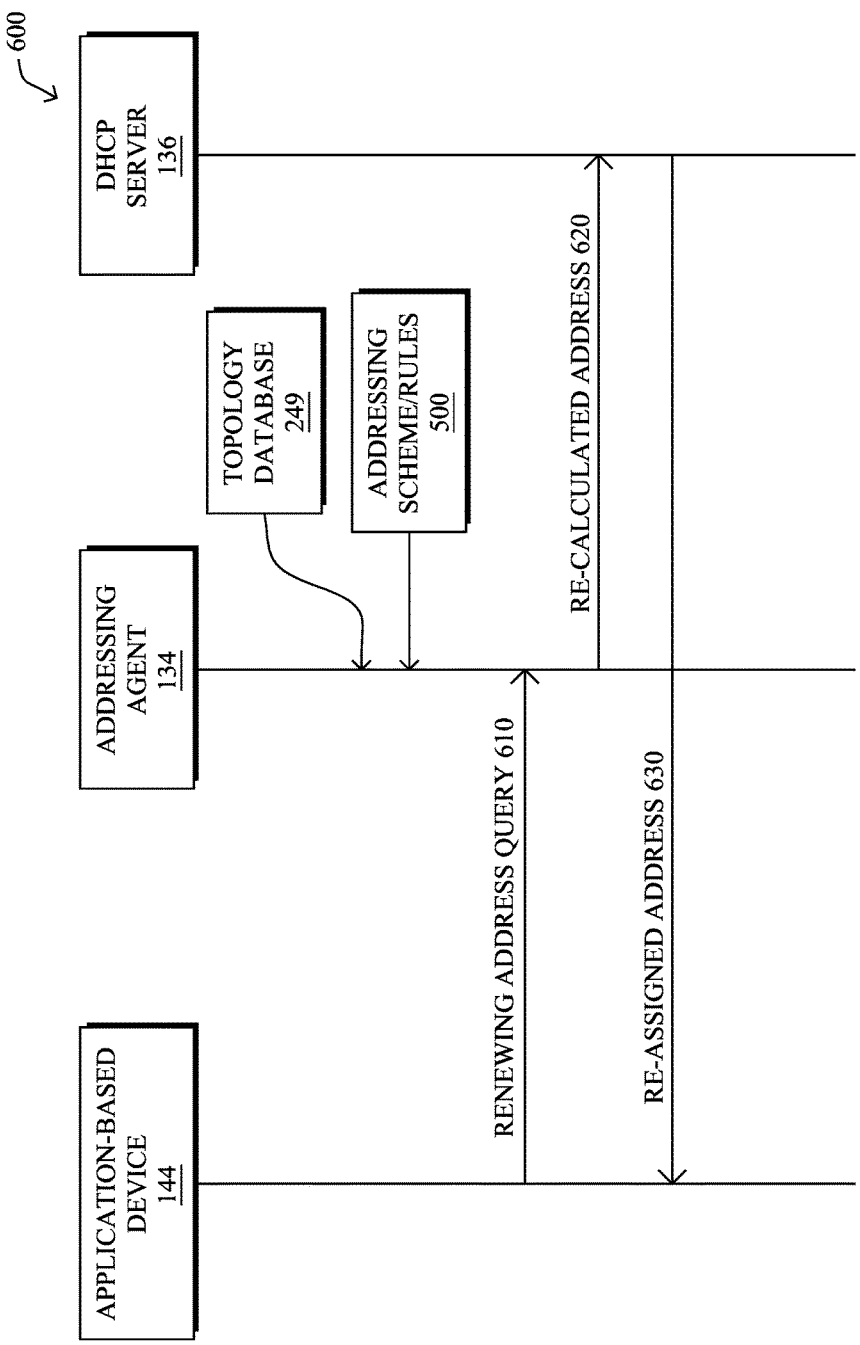

Once the new addresses are calculated, then similar to above, the addressing agent collaboratively assigns the corresponding re-calculated dynamic IP address to each respective affected application-based device, accordingly. Notably, in certain types of networks, topology changes may cause a power outage for existing devices affected by the change, so the affected clients reboot, and request their (now updated) addresses as part of their start-up process. Otherwise, the new addresses must be updated on the devices on-the-fly. FIGS. 9A-9C illustrate various (non-limiting) options for providing the updated addresses according to the techniques herein. (Note that any of the techniques may be used, and in any combination, such as based on first determining update capabilities of the application-based devices 144.)

In particular, as shown in FIG. 9A, the addressing agent 134 may coordinate to power-cycle certain affected application-based devices to update the assigned corresponding re-calculated dynamic IP address on those one or more affected application-based devices. For example, certain client devices may operate using PoE, so programmatically power-cycling devices may be possible to force the devices to get a new IP address. Alternatively, as shown in FIG. 9B, the addressing agent may coordinate to push a dynamic update (e.g., DHCP dynamic updates) to one or more of the affected application-based devices, if known to work on the particular clients. As still another alternative, as shown in FIG. 9C, the addressing agent may simply await a dynamic IP address lease renewal for devices to update their assigned re-calculated dynamic IP address. Since in this embodiment, it may be beneficial to configure a short lease for DHCP, this may be burdensome in certain networks, and either of the techniques in FIGS. 9A-9B may be a better option.

Figure 10:
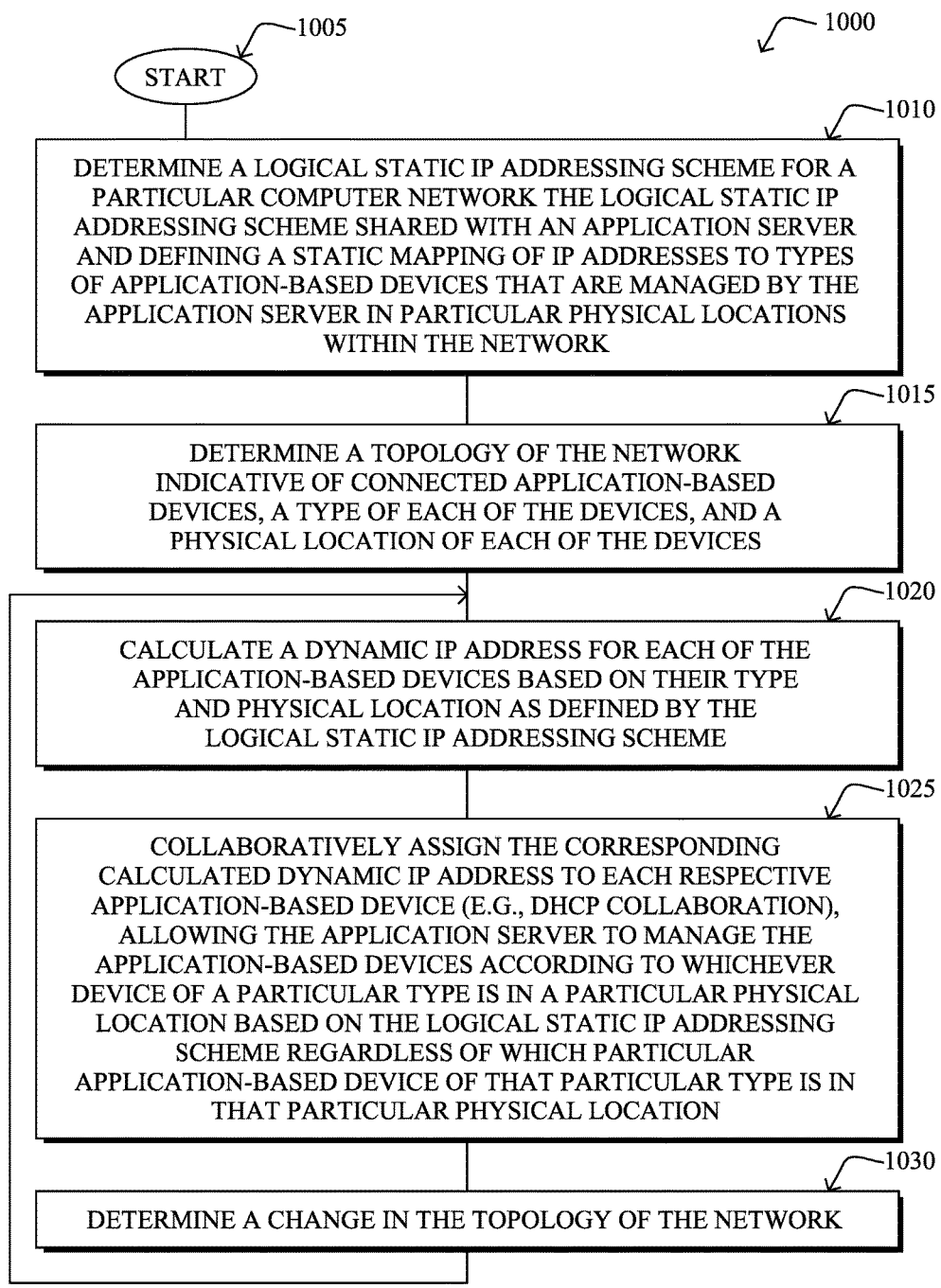
FIG. 10 illustrates an example simplified procedure for topology-aware addressing for reconfigurable networks.

FIG. 10 illustrates an example simplified procedure for topology-aware addressing for reconfigurable networks in accordance with one or more embodiments described herein. The procedure 1000 may start at step 1005, and continues to step 1010, where, as described in greater detail above, an addressing agent 134 determines a logical static IP addressing scheme 500 for a particular computer network 140 (e.g., a train-based network or other suitable network). As mentioned above, the addressing scheme is shared with an application server 132 and defines a static mapping of IP addresses to one or more particular types of application-based devices that are managed by the application server in particular physical locations within the particular computer network.

In step 1015, the addressing agent may also determine a topology of the particular computer network 140, indicating one or more application-based devices 144 connected in the particular computer network, as well as a type of each of the application-based devices, and a physical location of each of the application-based devices (e.g., defined as device location in relation to other devices in the computer network). Notably, the topology may either be determined as part of a routing protocol with vision into the network, or else may be received by another topology collection system (e.g., one or more switches 142, servers 132, etc.).

In step 1020, the addressing agent calculates a dynamic IP address for each of the application-based devices based on the type and physical location of the respective device, as defined by the logical static IP addressing scheme. As such, in step 1025, the addressing agent may collaboratively assign the corresponding calculated dynamic IP address to each respective application-based device in the network. This allows the application server 132 to manage the application-based devices according to whichever device of a particular type is in a particular physical location based on the logical static IP addressing scheme regardless of which particular application-based device of that particular type is in that particular physical location, as demonstrated in the examples given above.

Note that as also mentioned above, various methods of collaboration may be used to assign the addresses, such as collaborating with a DHCP server in one embodiment (e.g., using option 82), being a component of a DHCP server in another embodiment (i.e., directly assigning the addresses), or other suitable collaborative techniques. For instance, as mentioned above, DHCP instructions (indicative of the corresponding calculated dynamic IP address for each respective application-based device) may be configured into network devices (e.g., switches 142) of the network providing connectivity to the application-based devices, or else directly into the DHCP server. In another example, the agent may intercept DHCP messages from the application-based devices to the DHCP server, and inserts DHCP instructions into the DHCP messages. (Other techniques may be used, and those mentioned herein are merely representative examples.)

In response to determining a change in the topology of the particular computer network in step 1030, the procedure 1000 may return to step 1020 to re-calculate a dynamic IP address for application-based devices affected by the change in topology (and again based on the type and physical location of the respective application-based device as defined by the logical static IP addressing scheme), and then to step 1025 to collaboratively assign the corresponding re-calculated dynamic IP address to each respective affected application-based device. For instance, as described above, this re-assigning may consist of any number of update methods available to the agent, or else suitable for a particular device's determined ability. For example, as mentioned above, the agent may power-cycle certain affected application-based devices to update the assigned corresponding re-calculated dynamic IP address on those affected application-based devices, or else may push a dynamic update, if the devices are configured to allow such an update. Alternatively, certain devices may simply be updated by awaiting a dynamic IP address lease renewal of the affected application-based devices (e.g., a short lease renewal period).

The procedure 1000 may continue actively to detect further topology changes in step 1030 (e.g., locational relationship changes, new/removed devices, connectivity changes, etc.), or else may essentially restart and initialize device address in the event a new addressing scheme is defined by/for an associated application server. It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for topology-aware addressing for reconfigurable networks. In particular, the techniques herein create location-dependent logical IP addresses (e.g., via DHCP) that get dynamically re-assigned to application-based devices (e.g., client devices) under topology reconfiguration. As such, the techniques allow for easy integration of existing business applications into reconfigurable networks without changes to those business applications, and reduce the operational expense (OPEX) of reconfigurable networks by eliminating ongoing network addressing and/or application reconfiguration whenever network topology changes occur (e.g., whenever trains are re-married), particularly manual reconfiguration on the client devices or the application server. Furthermore, the techniques herein do not need to need to maintain a NAT table or use any NAT devices in the computer network, as the client devices (application-based devices) are dynamically assigned the appropriate IP addresses directly based on the "unchanging" addressing-scheme of the corresponding application server (and associated business application(s)).

While there have been shown and described illustrative embodiments that provide for topology-aware addressing for reconfigurable networks, it is to be understood that various other adaptations and modifications may be made within the spirit and scope of the embodiments herein. For example, the embodiments have been shown and described herein with relation to train-based networks as a primary example. However, the embodiments in their broader sense are not as limited, and may, in fact, be used with other types of configurable networks, including home/building security systems, home/building management systems (e.g., environmental control, smart sensors, etc.), industrial automation, and so on, regardless of how often such reconfiguration may occur in such networks. In addition, it should be noted that a configurable network may include networks that generally remain "fixed", meaning once they are set up, little, if any, changes are expected. The techniques herein may still be applicable in such situations, for example, to reduce the cost of rolling out networks based on templates that could be embodied in the policy rule, (e.g., rolling out networks in branches with certain types of known topologies and resulting in the desired addressing of installed devices). Moreover, while certain protocols are shown, such as DHCP (and particular DHCP options), other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
determining, at an addressing agent, a logical static Internet Protocol (IP) addressing scheme for a particular computer network, the logical static IP addressing scheme shared with an application server and defining a static mapping of IP addresses to one or more particular types of application-based devices that are managed by the application server in particular physical locations within the particular computer network;
determining, by the addressing agent, a topology of the particular computer network, the topology indicative of one or more application-based devices connected in the particular computer network, a type of each of the one or more application-based devices, and a physical location of each of the one or more application-based devices within the particular computer network;
calculating, by the addressing agent, a dynamic IP address for each of the one or more application-based devices based on the type and physical location of the respective application-based device as defined by the logical static IP addressing scheme;
collaboratively assigning, by the addressing agent, the corresponding calculated dynamic IP address to each respective application-based device of the one or more application-based devices in the particular computer network, allowing the application server to manage the one or more application-based devices according to whichever device of a particular type is in a particular physical location based on the logical static IP addressing scheme regardless of which particular application-based device of that particular type is in that particular physical location; and
determining a change in the topology of the particular computer network; and in response,
re-calculating a dynamic IP address for one or more application-based devices affected by the change in topology based on the type and physical location of the respective application-based device as defined by the logical static IP addressing scheme, and
collaboratively assigning the corresponding re-calculated dynamic IP address to each respective affected application-based device.

2. The method as in claim 1, wherein physical location in the computer network is defined as device location in relation to other devices in the computer network.

3. The method as in claim 1, further comprising:
power-cycling one or more of the affected application-based devices to update the assigned corresponding re-calculated dynamic IP address on those one or more affected application-based devices.

4. The method as in claim 1, further comprising:
pushing a dynamic update to one or more of the affected application-based devices to update the assigned corresponding re-calculated dynamic IP address on those one or more affected application-based devices.

5. The method as in claim 1, further comprising:
awaiting a dynamic IP address lease renewal of one or more of the affected application-based devices to update the assigned corresponding re-calculated dynamic IP address on those one or more affected application-based devices.

6. The method as in claim 1, wherein collaboratively assigning comprises:
collaborating with a dynamic host configuration protocol (DHCP) server.

7. The method as in claim 6, wherein collaborating with the DHCP server comprises:

configuring DHCP instructions into network devices of the particular computer network providing connectivity to the application-based devices, the DHCP instructions indicative of the corresponding calculated dynamic IP address for each respective application-based device of the one or more application-based devices in the particular computer network.

8. The method as in claim 6, wherein collaborating with the DHCP server comprises:
configuring DHCP instructions into the DHCP server, the DHCP instructions indicative of the corresponding calculated dynamic IP address for each respective application-based device of the one or more application-based devices in the particular computer network.

9. The method as in claim 6, wherein collaborating with the DHCP server comprises:
intercepting DHCP messages from the application-based devices to the DHCP server; and
inserting DHCP instructions into the DHCP messages, the DHCP instructions indicative of the corresponding calculated dynamic IP address for each respective application-based device sourcing the corresponding intercepted DHCP message.

10. The method as in claim 6, wherein collaborating with the DHCP server comprises:
utilizing a DHCP option 82.

11. The method as in claim 1, wherein determining the topology of the particular computer network comprises:
receiving the topology from a topology collection system.

12. The method as in claim 1, wherein the particular computer network is a train-based network.

13. An apparatus, comprising:
one or more network interfaces to communicate with a particular computer network as an addressing agent;
a processor coupled to the network interfaces and adapted to execute one or more processes; and
a memory configured to store a process executable by the processor, the process when executed operable to:
determine a logical static Internet Protocol (IP) addressing scheme for a particular computer network, the logical static IP addressing scheme shared with an application server and defining a static mapping of IP addresses to one or more particular types of application-based devices that are managed by the application server in particular physical locations within the particular computer network;
determine a topology of the particular computer network, the topology indicative of one or more application-based devices connected in the particular computer network, a type of each of the one or more application-based devices, and a physical location of each of the one or more application-based devices within the particular computer network;
calculate a dynamic IP address for each of the one or more application-based devices based on the type and physical location of the respective application-based device as defined by the logical static IP addressing scheme;
collaboratively assign the corresponding calculated dynamic IP address to each respective application-based device of the one or more application-based devices in the particular computer network, allowing the application server to manage the one or more application-based devices according to whichever device of a particular type is in a particular physical location based on the logical static IP addressing scheme regardless of which particular application-based device of that particular type is in that particular physical location; and
determine a change in the topology of the particular computer network; and in response,
re-calculate a dynamic IP address for one or more application-based devices affected by the change in topology based on the type and physical location of the respective application-based device as defined by the logical static IP addressing scheme, and
collaboratively assign the corresponding re-calculated dynamic IP address to each respective affected application-based device.

14. The apparatus as in claim 13, wherein physical location in the computer network is defined as device location in relation to other devices in the computer network.

15. The apparatus as in claim 13, wherein the process when executed is further operable to:
use an update method to update the assigned corresponding re-calculated dynamic IP address on the one or more affected application-based devices, the update method selected from a group consisting of:
power-cycling one or more of the affected application-based devices to update the assigned corresponding re-calculated dynamic IP address on those one or more affected application-based devices;
pushing a dynamic update to one or more of the affected application-based devices to update the assigned corresponding re-calculated dynamic IP address on those one or more affected application-based devices; and
awaiting a dynamic IP address lease renewal of one or more of the affected application-based devices to update the assigned corresponding re-calculated dynamic IP address on those one or more affected application-based devices.

16. The apparatus as in claim 13, wherein the process when executed to collaboratively assign is further operable to:
collaborate with a dynamic host configuration protocol (DHCP) server.

17. The apparatus as in claim 16, wherein the process when executed to collaborate is further operable to:
use a collaboration method to collaborate with the DHCP server selected from a group consisting of:
configuring DHCP instructions into network devices of the particular computer network providing connectivity to the application-based devices, the DHCP instructions indicative of the corresponding calculated dynamic IP address for each respective application-based device of the one or more application-based devices in the particular computer network;
configuring DHCP instructions into the DHCP server, the DHCP instructions indicative of the corresponding calculated dynamic IP address for each respective application-based device of the one or more application-based devices in the particular computer network; and
intercepting DHCP messages from the application-based devices to the DHCP server, and inserting DHCP instructions into the DHCP messages, the DHCP instructions indicative of the corresponding calculated dynamic IP address for each respective application-based device sourcing the corresponding intercepted DHCP message.

18. A tangible, non-transitory, computer-readable media having software encoded thereon, the software when executed by a processor on an addressing agent in a particular computer network operable to:
  determine a logical static Internet Protocol (IP) addressing scheme for the particular computer network, the logical static IP addressing scheme shared with an application server and defining a static mapping of IP addresses to one or more particular types of application-based devices that are managed by the application server in particular physical locations within the particular computer network;
  determine a topology of the particular computer network, the topology indicative of one or more application-based devices connected in the particular computer network, a type of each of the one or more application-based devices, and a physical location of each of the one or more application-based devices within the particular computer network;
  calculate a dynamic IP address for each of the one or more application-based devices based on the type and physical location of the respective application-based device as defined by the logical static IP addressing scheme;
  collaboratively assign the corresponding calculated dynamic IP address to each respective application-based device of the one or more application-based devices in the particular computer network, allowing the application server to manage the one or more application-based devices according to whichever device of a particular type is in a particular physical location based on the logical static IP addressing scheme regardless of which particular application-based device of that particular type is in that particular physical location; and
  determine a change in the topology of the particular computer network; and in response,
    re-calculate a dynamic IP address for one or more application-based devices affected by the change in topology based on the type and physical location of the respective application-based device as defined by the logical static IP addressing scheme, and
    collaboratively assign the corresponding re-calculated dynamic IP address to each respective affected application-based device.

* * * * *